UNITED STATES PATENT OFFICE.

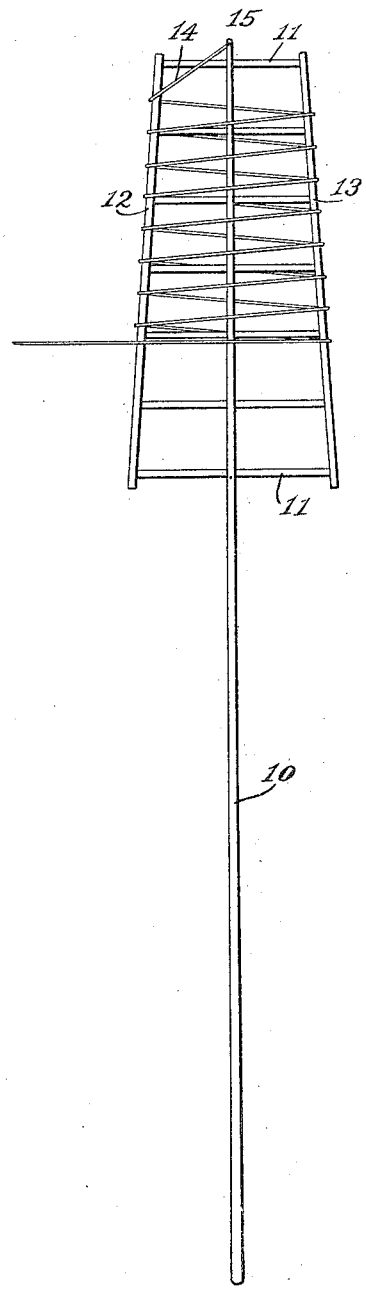

YOUNG N. PARK, OF DINUBA, CALIFORNIA.

FISHING-ROD.

1,377,787.   Specification of Letters Patent.   Patented May 10, 1921.

Application filed September 16, 1920. Serial No. 410,696.

*To all whom it may concern:*

Be it known that I, YOUNG N. PARK, a native of Chosen, not a citizen of the United States, reading at Dinuba, in the county of Tulare and State of California, have invented new and useful Improvements in Fishing-Rods, of which the following is a specification.

This invention relates to a fishing rod.

The object of the invention is to construct a fishing rod so that a fishing line may be taken up or let out during the course of fishing without the use of a reel.

It is also an object of the invention that the rod be so constructed that the fishing line may be wound thereon when not in use.

The invention consists in employing any type of fishing rod, whether rigid or jointed, and adjacent the outer end thereof providing a frame upon which the fishing line may be wound or unwound by turning the rod.

The invention is shown by way of illustration in the accompanying drawing, in which the figure represents a perspective view of the invention when applied to an unjointed fishing rod.

Referring to the drawing more particularly, 10 indicates a fishing rod of the rigid or unjointed type. The rod tapers toward its outer end in the usual manner to give the rod the required flexibility. Adjacent the outer end of the rod is secured the frame upon which the fishing line may be wound and unwound. This frame may be of any desired shape and construction. In the present instance the frame comprises a plurality of parallel cross members 11, the like ends of which are connected by the rails 12 and 13. Each cross member is rigidly centrally secured to the rod 10, and they decrease in length toward the outer end of the rod, the object of which is to make the rails 12 and 13 converge toward the outer end of the rod. The purpose of having the rails converge toward the outer end is to permit different rates in letting out or taking up of the fishing line, that is, the amount of line taken up or let out by one complete turn of the rod or frame is least when the line is being wound about the outer end of the frame and this amount gradually increases as the winding moves toward the other end of the frame. At the same rate of turning the rod the operator may obtain various rates in letting out or taking up the line. The line 14 is in this instance shown as attached at its one end to the end of the rod as at 15. It would, however, be permissible to attach the line at any other suitable place on the rod, or to the frame. The fishing line is illustrated in the drawing as being partly wound about the frame or rails 12 and 13, the remainder of the line which leads to the water, is not shown.

The operation of my invention has become clearly obvious from the foregoing description and a detailed description thereof is unnecessary.

While I have shown the preferred form and construction of my invention it is to be understood that various changes could be made without departing from the spirit of my invention as claimed.

Having thus described my invention, what I claim and desire to secure by Letters Patent is—

1. A fishing rod having a frame adjacent its outer end about which a fishing line may be wound or unwound.

2. A fishing rod carrying a reel on its outer end about which a line may be wound or unwound upon the turning of the rod.

3. A fishing rod having a frame secured adjacent its outer end about which a fishing line may be wound or unwound, said frame comprising a plurality of cross members secured to the rod and a pair of rails connecting the different cross members upon which a fishing line may be wound.

4. A fishing rod having a frame secured adjacent its outer end about which a fishing line may be wound or unwound, said frame comprising a plurality of cross members secured to the rod and a rail connected to the similar ends of each of the cross braces upon which a fishing line may be wound.

5. A fishing rod having a frame secured adjacent its outer end about which a fishing line may be wound or unwound, said frame comprising a plurality of cross members secured to the rod and a pair of rails connecting the different cross members upon which a fishing line may be wound, said rails converging toward the outer end of the rod.

6. A fishing rod carrying means on its outer end upon which a line may be wound or unwound upon the turning of the rod, said means being adapted to permit variations in the amount of line taken up or let out by the turning of said rod.

7. In combination with a fishing rod, a reel member longitudinally disposed and fixed at its outer end, a fishing line secured to the end of the rod and adapted to be wound on the reel as the rod is rotated.

8. In combination with a fishing rod a reel longitudinally disposed and fixed on the outer end of the rod, said reel having a winding circumference progressively varying in diameter throughout the length of the reel, a fishing line secured to the end of the rod and adapted to be wound upon the reel as the rod is rotated.

In testimony whereof I have hereunto set my hand in the presence of two subscribing witnesses.

YOUNG N. PARK.

Witnesses:
   LE ROY G. SMITH,
   S. K. HAHN.